US008863868B2

(12) United States Patent
Campbell

(10) Patent No.: US 8,863,868 B2
(45) Date of Patent: Oct. 21, 2014

(54) WHEEL MECHANISM

(76) Inventor: Colin Alan Campbell, South Pasadena, CA (US)

(*) Notice: Subject to any disclaimer, the term of this patent is extended or adjusted under 35 U.S.C. 154(b) by 0 days.

(21) Appl. No.: 12/944,324

(22) Filed: Nov. 11, 2010

(65) Prior Publication Data

US 2011/0057421 A1    Mar. 10, 2011

Related U.S. Application Data

(60) Division of application No. 11/538,138, filed on Oct. 3, 2006, now Pat. No. 7,854,435, and a continuation of application No. 11/538,138, filed on Oct. 3, 2006, now Pat. No. 7,854,435.

(60) Provisional application No. 60/724,168, filed on Oct. 6, 2005.

(51) Int. Cl.
*B62B 3/00* (2006.01)
*B62B 5/02* (2006.01)
*B62B 9/02* (2006.01)

(52) U.S. Cl.
CPC ............... *B62B 5/02* (2013.01); *B62B 2301/08* (2013.01); *B62B 3/008* (2013.01); *B62B 9/02* (2013.01)
USPC ........................... 180/65.1; 280/43; 280/43.1

(58) Field of Classification Search
USPC ............... 280/87.01, 87.021, 87.042, 11.215, 280/11.217, 11.221, 11.222, 11.223, 280/11.232, 79.11, 79.2, 79.3, 79.5–79.7
See application file for complete search history.

(56) References Cited

U.S. PATENT DOCUMENTS

| 73,398 | A | 1/1868 | Smith |
| 171,367 | A | 12/1875 | Estes |
| 280,236 | A | 6/1883 | Phillips |
| 490,716 | A | 1/1893 | Murphy |
| 576,106 | A | 2/1897 | Frankenberg et al. |
| 954,993 | A | 4/1910 | Peters |
| 1,832,770 | A | 11/1931 | Hallowell |
| 1,868,548 | A | 7/1932 | Turner |
| 2,220,557 | A | 11/1940 | User |
| 2,412,290 | A | 12/1946 | Rieske |
| 2,565,237 | A | 8/1951 | Kinter |
| 2,573,206 | A | 10/1951 | Lee et al. |
| 2,644,692 | A | 7/1953 | Kahlert |
| 2,772,096 | A | 11/1956 | Hanson |
| 3,282,598 | A | 11/1966 | Goodwin |

(Continued)

FOREIGN PATENT DOCUMENTS

FR    1431185 A    5/1966

OTHER PUBLICATIONS

Information Disclosure Statement dated Jan. 2, 2007 for U.S. Appl. No. 11/538,138.

(Continued)

*Primary Examiner* — J. Allen Shriver, II
*Assistant Examiner* — Travis Coolman
(74) *Attorney, Agent, or Firm* — Schnader Harrison Segal & Lewis LLP

(57) ABSTRACT

A cart comprising a platform configured to support something being transported. The cart has primary wheels including two or more rows of three or more non-swivelable wheels wherein the lower-most points of the wheels in a row form an arc. The wheels longitudinally span at least a portion of the platform.

31 Claims, 11 Drawing Sheets

(56) References Cited

U.S. PATENT DOCUMENTS

| | | | |
|---|---|---|---|
| 3,348,518 A * | 10/1967 | Forsyth et al. | 440/12.66 |
| 3,450,219 A * | 6/1969 | Fleming | 180/8.2 |
| 3,515,401 A * | 6/1970 | Gross | 280/5.26 |
| 3,558,152 A | 1/1971 | Miles et al. | |
| 3,630,540 A | 12/1971 | Smith | |
| 3,696,877 A | 10/1972 | Dessureault | |
| 3,891,234 A | 6/1975 | Auer et al. | |
| 3,978,936 A | 9/1976 | Schwartz | |
| 4,221,275 A | 9/1980 | Pennebaker et al. | |
| 4,247,125 A | 1/1981 | Rayment | |
| 4,412,595 A | 11/1983 | Kinzel | |
| 4,560,033 A | 12/1985 | DeWoody et al. | |
| 5,022,669 A * | 6/1991 | Johnson | 280/30 |
| 5,098,087 A | 3/1992 | Matile et al. | |
| 5,183,276 A | 2/1993 | Pratt | |
| 5,251,920 A | 10/1993 | McHale | |
| 5,413,362 A | 5/1995 | De Santis | |
| 5,478,096 A * | 12/1995 | Ting | 280/30 |
| 5,549,309 A | 8/1996 | Gleichmann | |
| 5,553,874 A | 9/1996 | Schouten et al. | |
| 5,556,118 A | 9/1996 | Kern et al. | |
| 5,588,658 A | 12/1996 | Perner et al. | |
| 5,620,189 A | 4/1997 | Hinderhofer | |
| 5,701,965 A * | 12/1997 | Kamen et al. | 180/7.1 |
| 5,707,068 A | 1/1998 | Bradfield | |
| 5,763,980 A | 6/1998 | Li | |
| 5,791,425 A * | 8/1998 | Kamen et al. | 180/7.1 |
| 5,855,385 A | 1/1999 | Hambsch | |
| 5,873,425 A * | 2/1999 | Yang | 180/65.6 |
| 5,899,467 A * | 5/1999 | Henkel | 280/47.25 |
| 5,934,857 A | 8/1999 | Alexander | |
| 5,971,091 A * | 10/1999 | Kamen et al. | 180/218 |
| 6,024,376 A | 2/2000 | Golichowski et al. | |
| 6,062,600 A * | 5/2000 | Kamen et al. | 280/755 |
| 6,070,885 A | 6/2000 | Ferone | |
| 6,357,544 B1 * | 3/2002 | Kamen et al. | 180/218 |
| 6,367,821 B2 * | 4/2002 | Thiele | 280/30 |
| 6,375,204 B1 | 4/2002 | Tu | |
| 6,398,230 B1 | 6/2002 | Rudolph | |
| 6,431,568 B1 | 8/2002 | McCleese | |
| 6,520,516 B2 | 2/2003 | Favorito et al. | |
| 6,531,838 B2 | 3/2003 | Parks | |
| 6,695,325 B2 | 2/2004 | Carillo | |
| 6,824,150 B2 | 11/2004 | Simione | |
| 6,845,990 B2 | 1/2005 | Van Egeraat | |
| 6,854,744 B2 * | 2/2005 | Brandler | 280/30 |
| 6,915,878 B2 * | 7/2005 | Kamen et al. | 182/141 |
| 7,353,918 B1 | 4/2008 | McIntyre | |
| 2002/0060444 A1 * | 5/2002 | Cote | 280/648 |
| 2003/0098552 A1 | 5/2003 | Hsiao | |
| 2003/0182759 A1 | 10/2003 | Breed et al. | |
| 2004/0094919 A1 | 5/2004 | Roder et al. | |

OTHER PUBLICATIONS

The Heavy-Duty Machine Mover, Product Catalog, Motion Savers, Inc. (2005).
Information Disclosure Statement dated May 22, 2008 for U.S. Appl. No. 11/538,138.
Vestil Manufacturing Corp. Website: http://www.vestilmfg.com/products/dhequip/multipurpose_drum_truck.htm; Multi-Purpose Drum Truck/Cradle (2 pages) Website created on Feb. 14, 1997.
Magliner Website: http://www.magliner.com/index.php?page=shop.product_details&flypage=shop.flypage&product_id=256&category_id=53&manufacturer_id=0&option=com_virtuemart&Itemid=30; Pallet Dollies (2 pages) Web site created on Feb. 11, 1997.
Restriction Requirement dated Jun. 6, 2008 for U.S. Appl. No. 11/538,138.
Response to Jun. 6, 2008 Restriction Requirement for U.S. Appl. No. 11/538,138.
Office Action dated Oct. 2, 2008 for U.S. Appl. No. 11/538,138.
Second Supplemental Information Disclosure Statement dated Oct. 30, 2008 for U.S. Appl. No. 11/538,138.
International Search Report dated Aug. 22, 2008 for PCT Patent Application No. PCT/US2006/039164.
Response to Oct. 2, 2008 Office Action for U.S. Appl. No. 11/538,138.
Restriction Requirement dated May 7, 2009 for U.S. Appl. No. 11/538,138.
Response to May 7, 2009 Second Restriction Requirement for U.S. Appl. No. 11/538,138.
Office Action dated Oct. 2, 2009 for U.S. Appl. No. 11/538,138.
Office Action dated Feb. 17, 2010 for U.S. Appl. No. 11/538,138.
Interview Summary dated Jun. 21, 2010 for U.S. Appl. No. 11/538,138.
Response to Feb. 17, 2010 Office Action for U.S. Appl. No. 11/538,138.
Information Disclosure Statement dated Jul. 13, 2010 for U.S. Appl. No. 11/538,138.
Notice of Allowability dated Aug. 16, 2010 for U.S. Appl. No. 11/538,138.
Extended European Search Report dated Mar. 30, 2011 for European Patent Application No. 06816428.4.

* cited by examiner

WHEEL MECHANISM

This application is a divisional and continuation of and claims priority to U.S. patent application Ser. No. 11/538,138, filed Oct. 3, 2006, which claims priority to U.S. provisional application having Ser. No. 60/724,168, and a filing date of Oct. 6, 2005 and further to provisional application having Ser. No. 60/775,488, and a filing date of Feb. 22, 2006, all entitled Wheel Mechanism, and all of which are hereby incorporated by reference.

FIELD OF THE INVENTION

The disclosed invention relates to wheel mechanisms for mobility applications.

BACKGROUND OF THE INVENTION

Various types of wheel mechanisms exist for strollers, shopping carts, gurneys and the like. A common drawback to the designs is maneuverability, particularly on uneven ground. Existing wheel mechanism designs include single wheels at each of the four corners of a cart, stroller, or other mobile unit that rotate on a front and rear axle that span the width of the unit. The front wheels, and sometimes the back wheels also can pivot from right to left with respect to forward and reverse movement of the unit, and vice versa, to facilitate turning. This is the type of wheel device used in automobiles, trucks, buses, etc.

Strollers and other carts often have separate wheel mechanisms for each of the four corners of the device. Each separate mechanism has a wheel that rolls forward or backward and also pivots about an axis for ease of turning. These mechanisms work well on level surfaces, and thus are appropriate for use on a shopping cart in a market or a gurney in a hospital, etc. but do not function as well on uneven surfaces or in small spaces. Additionally, these mechanisms have limitations even on smooth surfaces, such as a decrease in maneuverability associated with large or uneven loads. Accordingly, there is a need for a wheel mechanism that can be used on uneven surfaces, such as that which is found outdoors, up and down steps, or where a small turning radius is beneficial. Further, there is a need for improved maneuverability when carrying large or uneven loads.

SUMMARY OF THE INVENTION

Embodiments of the invention provide a wheel mechanism having two or more rows of three or more wheels wherein the lower-most points of the wheels in a row form an arc. The term "arc" is used broadly herein and includes other non-linear shapes that resemble an arc, but may not be considered an arc by a strict geometrical definition. The wheels may be disposed on runners affixed to a cart or be attached directly to a frame or floor component of the cart. An arced shape can be implemented by varying the diameter of the wheels or the attachment components.

Carts according to illustrative embodiments of the invention, may have handles, brakes, compartments, shelves, drawers and other features to enhance the utility or design of the cart.

The cart may also have a propulsion device and an associated control mechanism. Various types of control features can be incorporated mechanism, including, but not limited to an electronic stabilization mechanism, or electronic speed limitation device.

The wheel rows may be parallel to one another or angled. Angled wheel rows will allow nesting of carts.

These and other features will be described further below.

DESCRIPTION OF THE DRAWINGS

The invention is best understood from the following detailed description when read with the accompanying drawings.

DESCRIPTION OF THE INVENTION

Embodiments of the disclosed wheel mechanism can be used on numerous items, including, but not limited to, delivery carts, tool chests, hospital gurneys, baby strollers, moving dollies, suitcases, material handling equipment, etc. For simplicity of description the term "cart" will be used to encompass all applicable items.

Figure 2:
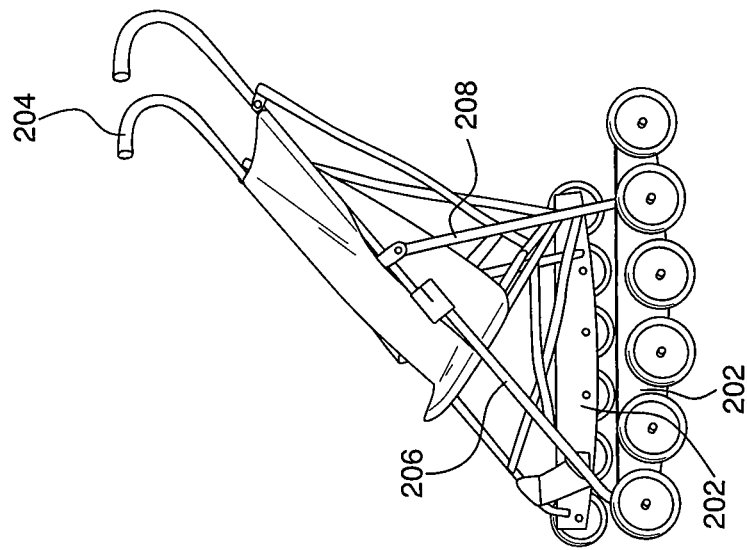
FIG. 2 depicts a stroller according to an illustrative embodiment of the invention.
Figure 1:
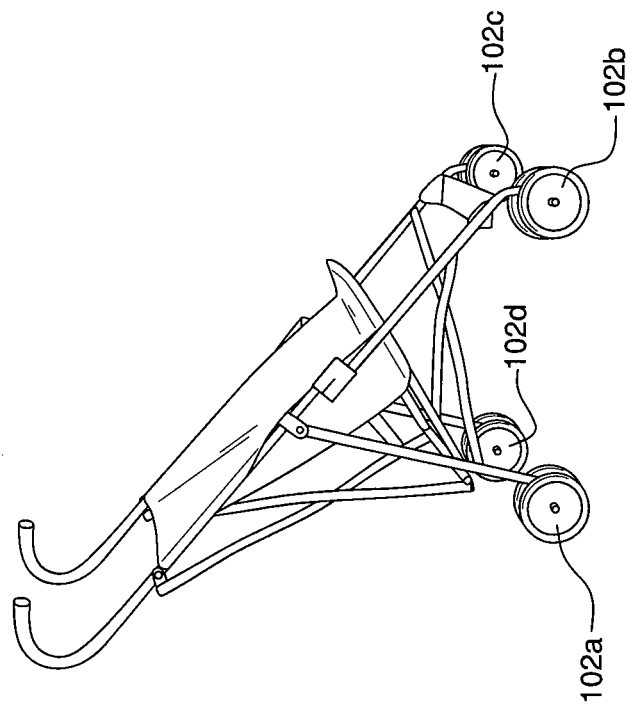
FIG. 1 depicts a prior art stroller.
Figure 3:
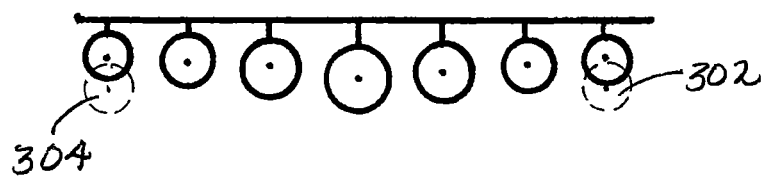
FIG. 3 depicts an arced wheel arrangement according to an illustrative embodiment of the invention.
Figure 4:
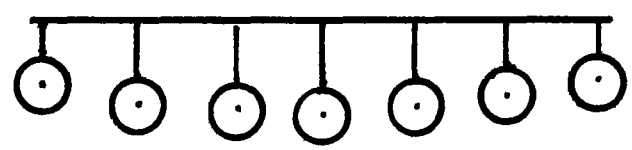
FIG. 4 depicts a further arced wheel arrangement according to an illustrative embodiment of the invention.

FIG. 1 depicts a prior art stroller having four groups 102a-d of two wheels each, in which the lower most point of each wheel is in substantially the same plane. FIG. 2 depicts a stroller according to an illustrative embodiment of the invention wherein the wheels are arranged in an arc so less than all of the wheels have their lower most point in the same plane. In this particular embodiment, the arced configuration is accomplished by having the wheels disposed at different heights on straight runners 202. Wheels can also be disposed on arced runners, such as depicted in FIGS. 2, 7, 8 and 10. FIGS. 3 and 4 are schematics of two additional illustrated wheel arrangements that create an arced formation. FIG. 3 depicts an arced wheel formation created using wheels differing in diameter from one another. The illustrative embodiment depicted in FIG. 4 achieves the arced shape using different length brackets to attach the wheels to a planar surface. Any combination of these designs can also be used to create the arced structure. It is noted that the features described with respect to strollers are applicable to other types of carts.

In an illustrative embodiment of the invention, the arced row of wheels spans the entire length of the cart and protrudes over the edge. The protrusion can provide additional stability to the cart. Other illustrative wheel row lengths include, greater than about 60% of the cart length and greater than about 80% of the cart length. Illustrative wheel row length ranges include, between about 65% and about 100%, and between about 75% and about 100%.

FIG. 3 also shows two additional wheels 302, 304 that are adjustably affixed to the cart. More than two adjustably fixed wheels can also be included on the cart. The wheels have at least a first adjusted position to allow the cart to rock on the arced runners and second adjusted position to prevent rocking on the arced runners but to allow the cart to roll. The second position is shown by dotted lines.

To tilt the prior art stroller backward, weight must be transferred from the front wheels entirely to the rear wheels. This can be very difficult, if for instance the center of gravity is toward the front and the weight needs to be transferred to the rear wheels so the stroller can be tilted backward to clear a curb. The illustrative stroller depicted in FIG. 2 can be more easily tilted than the prior art stroller because weight is transferred progressively along the runners by exerting pressure on the handles.

The embodiment depicted in FIG. 2 shows handles 204 that include a support 206 that attaches to the front of the runner 202 and another support 208 protruding from the line of the handle that is fastened toward the rear of the runner. Other configurations of handles and support structures are within the spirit and scope of the invention and will depend in part on the type of cart and the placement of the load. Handles and supports can be attached to the runners or to platforms or other components to which the wheels or runners are attached. Grips can also be added to handles. Handles can be adjustable in length or position, such as by being telescopic or movably attached. The ease by which carts having the inventive wheel mechanism can be turned may allow greater freedom of cart design. For example, the typical rectangular or u-shaped bar on a stroller that requires two hands to steer can be replaced by a single bar held in one hand. This can free the other hand for tasks such as opening doors when passing through a doorway. Carts do not necessarily need handles. Items on a cart or other components of the cart, such as walls, can serve the function of a handle. As long as the object or objects do not move relative to the cart, or only move a limited amount, when a force is exerted on them, they can serve the function of handles. For example, if the objects are secured to the cart by straps or if there is enough friction between the objects and the cart, they can serve the function of handles.

Figure 7:
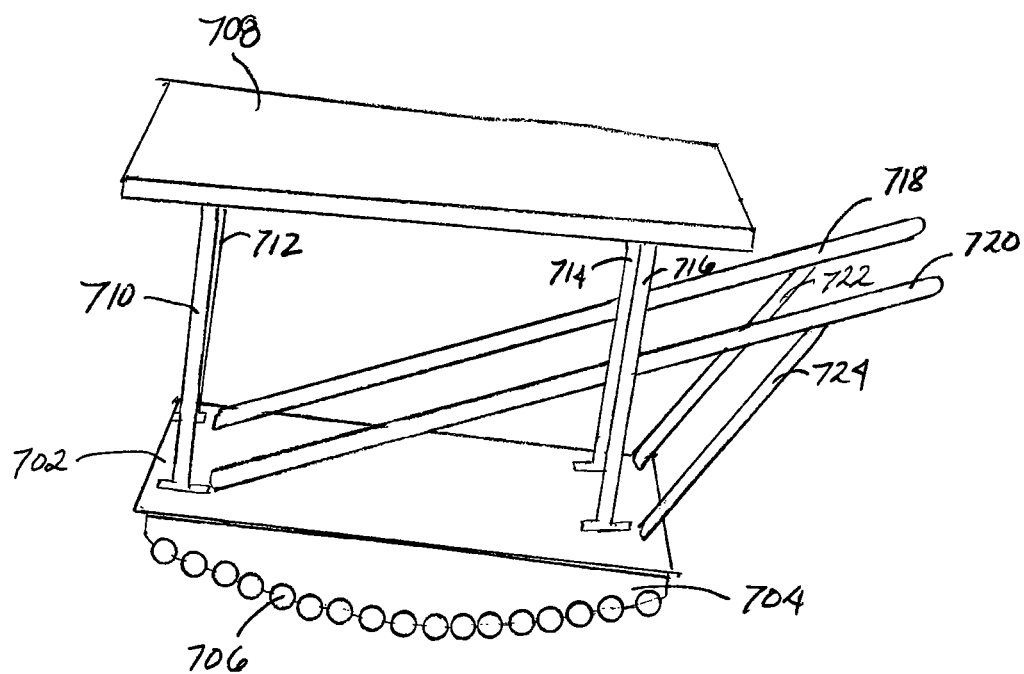
FIG. 7 depicts a two-tiered vehicle according to an illustrative embodiment of the invention.

The illustrative embodiment depicted in FIG. 7 shows straight handles, which is another example of handle type. In this configuration, the handles extend in a straight line to the front runner area. Rear supports extend at non-right angles from the handles to the rear runner area.

Cart handles may be stationary, adjustable to fixed positions or freely moveable. Adjustments may include, for example, height and angle. A handle may be freely movable in an angular motion, for example. This can facilitate wheeling a cart up and down steps by having the handled position itself in the most comfortable and/or useful position as the cart is tilted to climb the stairs.

The wheel mechanism may include two or more rows of a plurality of wheels. In an exemplary embodiment of the invention two wheel rows are identical to one another. The arc-shape allows only a limited number of wheels in a given row, or only a single wheel, to contact the ground at a particular time. This can improve the ease by which the cart can be maneuvered and can decrease the turning radius as compared to many traditional wheel mechanisms. Numerous wheel rows can be used on an individual cart. For example, a cart may have two parallel arced wheel rows and a third arced wheel row in the front, back or both to further guide or maneuver the cart. Not all wheel rows on a cart need to be in contact with the ground at the same time and need not be parallel to other wheel rows.

Advantageously, embodiments of the present invention may improve maneuverability when carrying uneven and/or large loads. Uneven loads, particularly heavy ones, can decrease maneuverability of a cart because the weight is not balanced over the turning wheels. "Turning wheels" as used herein are the wheels engaged with the ground at or near the pivot point when the device is turned. In exemplary embodiments of the invention the turning wheels are not merely either front or back wheels of the cart. The turning wheels can be any of a plurality of wheels spanning the row, and therefore, almost any weight can be distributed evenly over the turning wheels. In essence the turning wheels are self-selecting based on the distribution of the load on the cart. For example, if the load is concentrated toward the front of the cart, the cart will automatically rock forward on the curved row of wheels causing wheels at or near the front of the rows to be the turning wheels. This can improve maneuverability tremendously compared to traditional four-wheel designs.

The turning wheels or rolling wheels can also be user-selected by intentionally tilting the cart forward or backward. This could be necessary, for example, if an open package is being hauled and must be kept upright or tilted at a certain angle to maintain the package in an upright position.

By rocking the cart forward or backward on the arced wheel rows, the wheels can contact different ground elevations and facilitate moving the cart through rough terrain or from one surface to another surface at a different elevation. For example, to bring a cart onto a curb, the cart is wheeled to the curb and then rocked backward in a simple motion. Because the wheel line is curved, this backward rocking motion may require less effort than the force necessary to be exerted on a traditional stroller, for example, to tilt it backward to clear a curb. The backwardly tilted cart is then wheeled forward slightly until the front wheels clear the curb, at which time a force can be exerted on the cart in the forward direction while the cart is rocked forward, which will position the cart over the curb. The combination of the rocking motion and the forward or backward force allows the cart to be maneuvered relatively easily over varied surfaces as compared to carts having traditional wheel configurations.

To the best of the inventor's knowledge, the benefit of having arced rows of wheels as the primary wheels of a cart has not before been recognized. Traditional carts are designed with the lowermost point of each wheel in the same plane. A relatively small single curved runner has been used in conjunction with such planar wheel configurations for steering purposes or perhaps to improve maneuverability, but the problems associated with the primary planar wheel configuration are still present in these devices. Curved rows of wheels have also been used on in-line skates to accommodate the body motion necessary to propel the skates and balance thereon. Such attempts were not met with success and, accordingly, inline skates currently use straight, rather than curved runners.

In the preferred embodiment, the wheels themselves only move forward or backward and do not spin around a vertical axis. This is different than typical strollers or hospital gurneys, for example. The limited wheel motion of the inventive mechanism enables a larger number of wheels to be used on a single cart because they can be spaced closer together. As described above, this allows the turning wheels to be in any of a number of locations. Also, the greater the number of wheels in contact with the ground, the more easily they will roll, assuming other aspects of the wheels and cart are the same, because there is a smaller downward force on any single wheel. When rolling the cart up or down a series of steps more than one set of wheels may be in contact with the steps, unlike conventional four-wheel designs. This will allow carts to be brought up and down staircases within a manner not possible with traditional carts. The stationary wheel design also can reduce maintenance problems.

Figure 5:
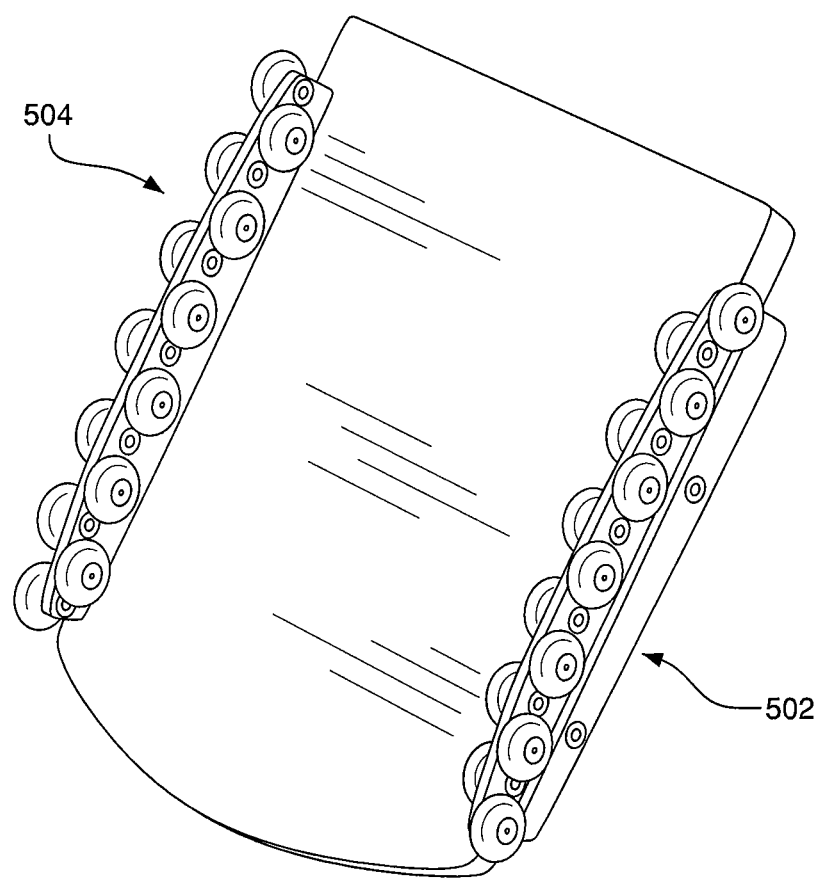
FIG. 5 depicts an illustrative embodiment of the invention having two runners, each with a double row of staggered wheels.

FIG. 5 shows an illustrative embodiment of the invention that contains two wheel sections 502, 504, each with a double row of wheels. In this particular embodiment, one row of wheels of the double row is staggered with the other row, thereby decreasing the spacing of the possible points of contact of the wheels, providing good stability on uneven terrain.

Figure 6:
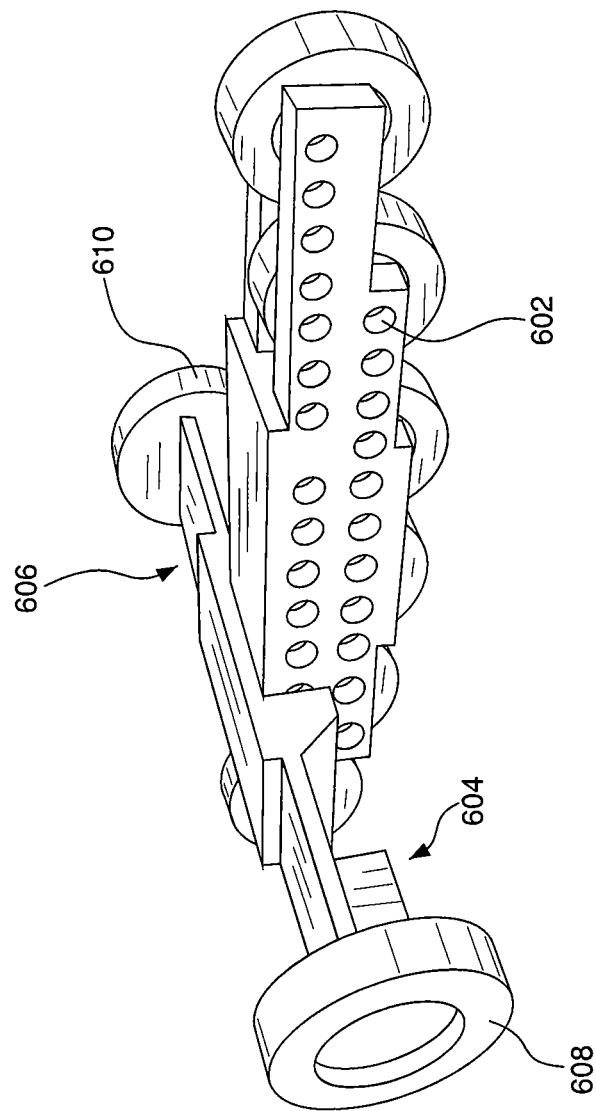
FIG. 6 depicts an illustrative embodiment of the invention having a center runner of wheels with outriggers on either side.

FIG. 6 depicts an illustrative embodiment of the invention, in which a single runner 602 is disposed along the center of the cart. The single runner pictured has one row of wheels, but this configuration can also have two rows. The wheels may be attached to a runner or directly to the cart. Outriggers 604, 606, with additional wheels 608, 610 attached, provide balance for the cart. It is possible for outrigger wheels 608, 610 to have a spring-type attachment to force the outrigger wheels toward the ground regardless of the degree the cart it tilted. This version is particularly suitable for a collapsible stroller or similar product.

FIG. 7 depicts a two-tiered configuration according to an illustrative embodiment of the invention. This configuration can be adapted for various uses, such as a medical gurney or other two tiered cart. A bottom tier 702 has curved runners 704 with wheels 706 disposed along the bottom edge. An upper tier 708 is supported above bottom tier 702 by posts 710, 712, 714, 716. Handles 718, 720 are supported by posts 722, 724, respectively. Components such as shelves, drawers, seats and compartments can be incorporated and be removable and interchangeable. For example, upper tier or shelf 708 can be removable and replaceable by drawers, compartments and/or other features to enhance the utility or design of the cart. The device can be open, as shown or contain enclosed areas, such as for storage. The illustrative wheel mechanism is such that even with a heavy load the apparatus can be made to be highly maneuverable compared to traditional carts. The cart may be constructed so the additional weight of storage compartments and their contents, or heavy cart construction materials, such as steel, will not have a significant adverse effect on maneuverability.

Figure 8:
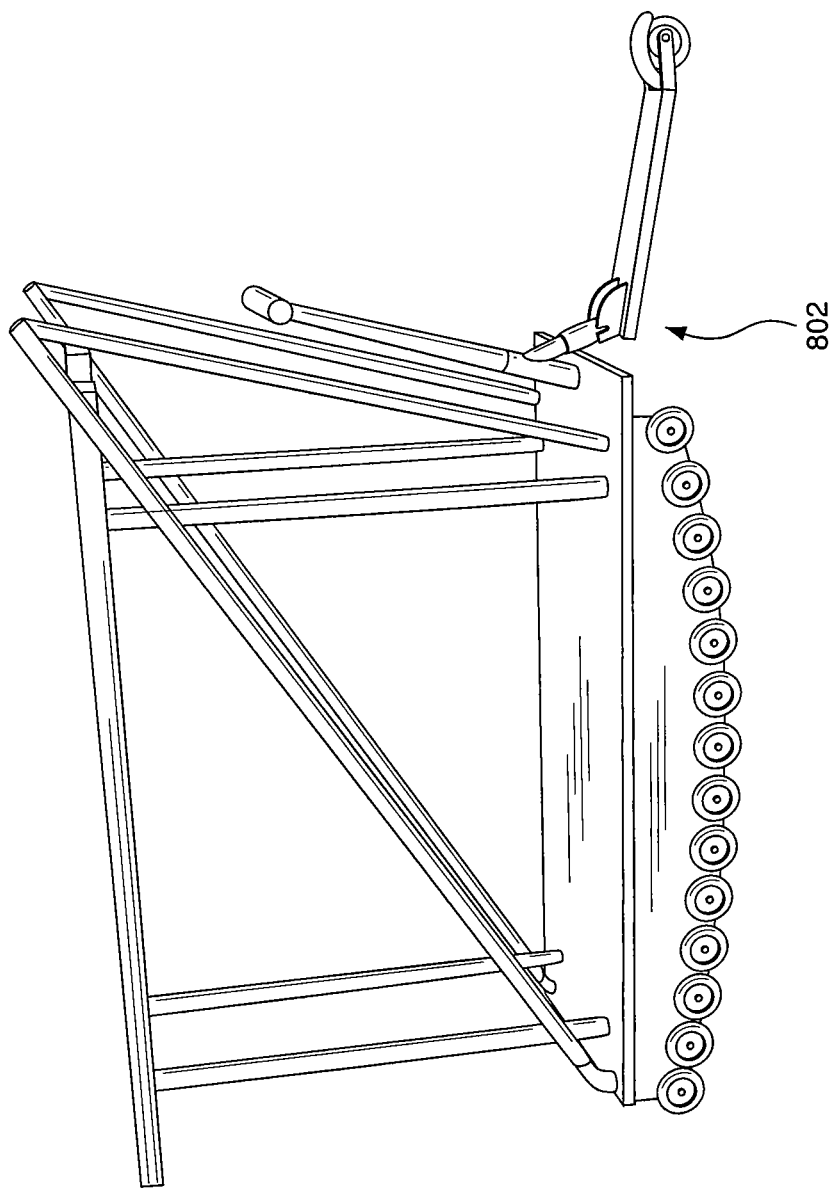
FIG. 8 depicts a cart with a propulsion device according to an illustrative embodiment of the invention.
Figure 11:
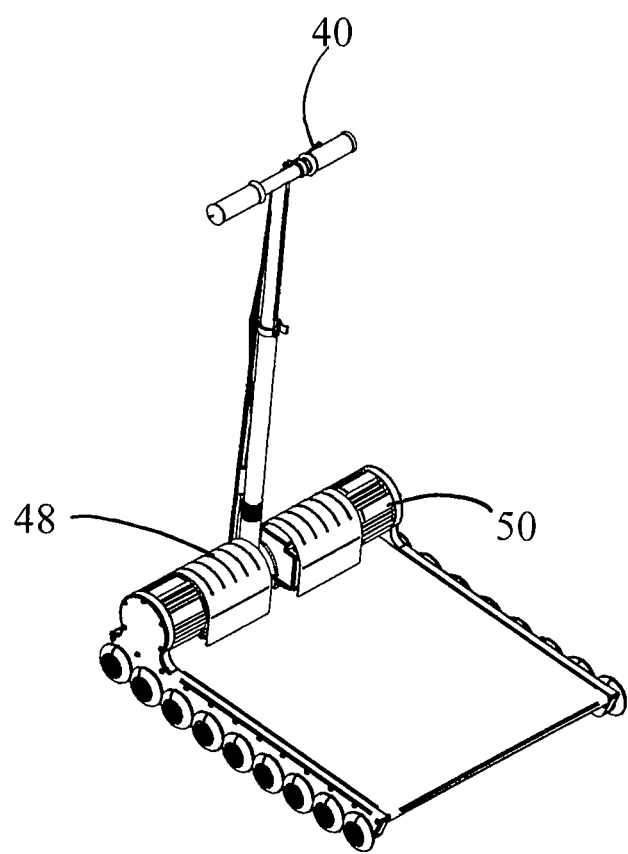
FIG. 11 depicts a personal motorized platform device according to an illustrative embodiment of the invention.

FIGS. 8 and 11 depict an illustrative embodiment of a device having a wheel mechanism and a propulsion component 802, 50. Certain applications may benefit from the addition of a propulsion mechanism, either to push, pull or otherwise propel the device. Examples of propulsion mechanisms include, but are not limited to, electric, gas or solar powered motors and manual mechanisms such as pedals. FIG. 11 shows a personal motorized cart with a propulsion mechanism having a motor, situated in housing 48. The propulsion mechanism may directly drive the rows of wheels, or drive one or more additional wheels attached directly or indirectly to the cart. Propulsion mechanisms can be controlled by switches, voice-activation, key-pads, or other devices functionally connected to the propulsion mechanism to turn it on and off, and vary other propulsion mechanism parameters. FIG. 11 shows a control mechanism 40 disposed on a handle of the cart. If the drive wheel(s) are not on the arced portion of the wheel mechanism, they should adjust so they can remain in contact with the ground when different wheels in the arced row are in contact with the ground.

Embodiments of the invention may also include an electronic stabilization mechanism and/or an electronic speed limitation device, which also may be situated in housing 48. Other electronic devices, such as obstacle recognition and associated alarm systems can also be incorporated into the cart.

The number of wheels in a row will depend, at least in part on the size and type of cart. In an illustrative embodiment of the invention, the rows have between about five wheels and about twenty wheels. Additional illustrative ranges include, between about six wheels and about fifteen wheels.

The optimum wheel size, durometer, profile (cross-section), rebound, core, weight, density, etc. will depend on a number of factors, for example, type of cart, weight to be placed on the cart and surface type on which the cart will be used. Wheel sizes can also vary along a particular runner. Various types of materials can be used for the wheels, including, but not limited to, rubber and polyurethane. If bearings are included, either shielded or sealed can be used, depending on the use of the mechanism and cost concerns.

The degree of wheel row or runner curvature can be fixed or adjustable. The curvature can most easily be made adjustable by having the wheel position adjustable with respect to the runner, base or frame of the cart. In addition to different degrees of curvature being possible, if for a particular use of a given cart, no curvature is desired, the wheels can be adjusted so they all contact a level surface at the same time.

Figure 9:
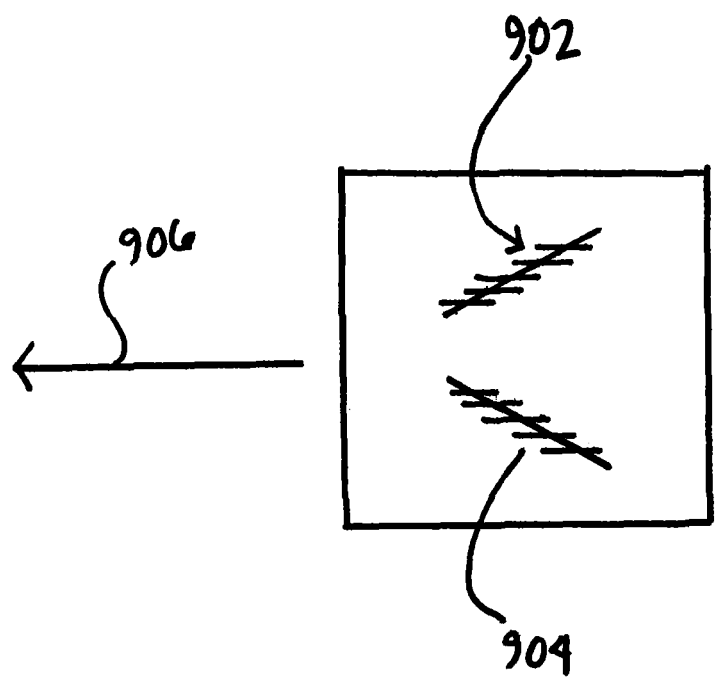
FIG. 9 depicts an angled wheel arrangement according to an illustrative embodiment of the invention.

The wheel rows can be parallel to the direction of motion as shown in FIGS. 2 and 5, or can be angled to allow nesting of carts. A schematic drawing of the underside of a cart showing angled wheel rows 902, 904 according to an illustrative embodiment of the invention is depicted in FIG. 9A. The direction of cart motion is shown by arrow 906. The rows can be angled with the vertex either toward the front or rear of the cart. The wheels will be positioned parallel to the direction of motion whether the wheel rows are parallel or angled. It is also possible to use wheels distributed in other patterns or distributed randomly, provided that the surface defined by the lower-most points of the wheels forms, at least in part, a curved surface, including an arc disposed longitudinally along the direction of motion, and the wheels forming the arced portion rotate in the same direction. For example, the lower most points of the wheels may form a lune of a sphere, a portion of a zone of a sphere, a spherical cap or any analogous section of an ellipsoid. The defined surface may be less regular than a sphere or ellipsoid, but still must have enough of a curve to facilitate wheeling and maneuvering the cart.

Figure 10:
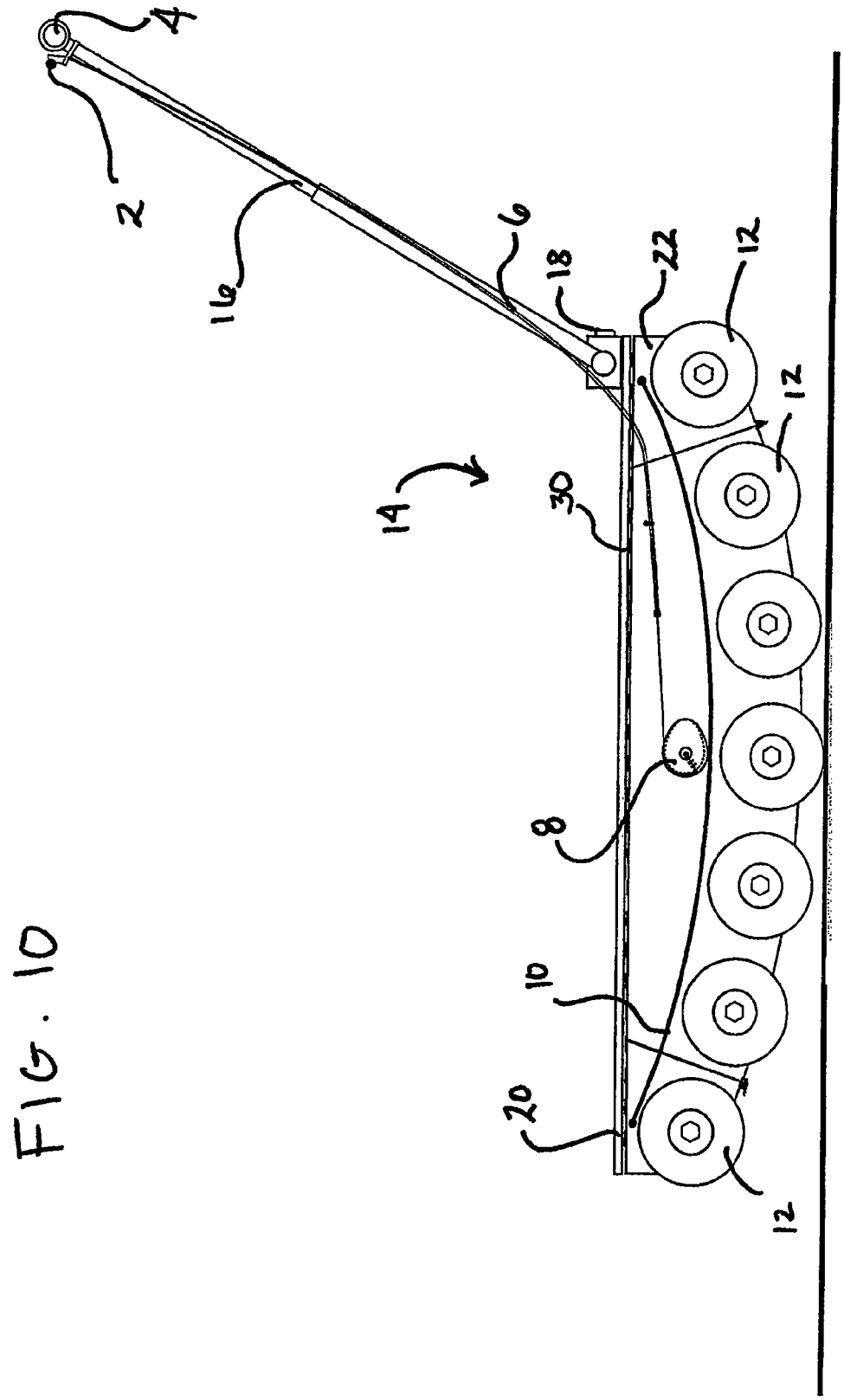
FIG. 10 depicts a cart having a braking system according to an illustrative embodiment of the invention.

For most types of carts having embodiments of the inventive wheel mechanism, it will be advantageous to include a brake or wheel locking mechanism. Front and/or back stops can be employed to keep the cart from rolling, for example when it is being loaded or unloaded. Other locking mechanisms, such as posts that are engaged with the floor can be a desirable addition. A braking system according to an illustrative embodiment of the invention will generally include a wedge to contact and slow or stop some or all of the wheels, a force exerting mechanism to apply pressure to the wedge to force it against the wheels, and a restoration mechanism to return the braking system to a non-engaged mode after application of the brake. An illustrative braking system is shown in FIG. 10. Hand brake lever 2 is positioned on handle 4 of cart 14. A cable 6 functionally connects hand brake lever 2 to brake cam 8. When lever 2 is depressed, it rotates cam 8, thereby applying pressure to brake wedge 10. This causes brake wedge 10 to contact wheels 12, thereby slowing or stopping the cart. A spring (not shown) can be functionally connected to cam 8 to facilitate disengagement of the brake by counteracting the brake handle. As not all wheels on the apparatus will be engaged with the ground at any one time, the braking system should serve to stop, at a minimum, all but the first and last wheels on a runner. If the wheels are not disposed on a runner, then enough wheels to assure at least one wheel contacting the ground is inhibited from turning.

In a further embodiment of the invention, braking is accomplished by directing one or more wheels in a non-forward direction. Preferably all wheels are redirected. This can be accomplished, for example by having the wheels on rotatable runners. The runners can be rotated using a cable system so the control component is displaced from the runners, or they can be rotated directly by a hand or foot action. The brake mechanism may also have a locking mechanism that can be employed after the brakes take effect to keep the cart stationary. Preferably each wheel row has a braking mechanism. A single handbrake can operate all wheel rows, or separate levers can be used to operate each brake. Other illustrative braking mechanisms include those having pads that are depressed against the wheels, foot-activated mechanisms, and for motorized carts, electronic braking systems. For example, a driving mechanism powered by independent motors and can work in conjunction with a control board running code that would enable the motors to work together to drive and turn. Applications of a motorized device, include, but are not limited to carts that move extremely heavy loads, wheel chairs, and personal motorized platforms.

When the wheel mechanism is used with a stroller, a wheel locking mechanism can transform the stroller into a rocker. Traditional strollers are often moved backward and forward to lull a child to sleep. As is well known, a rocking motion is particularly soothing for a child, adding a benefit to strollers using the inventive wheel mechanism compared to traditional strollers. Devices other than strollers may benefit from this transformation to a rocker, for example beds and chairs.

FIG. 10 also shows a telescoping post 16 that serves as an adjustable handle. A post release pin 18 is used to fix the handle at the desired angle. Other mechanisms to fix and release the handle and to adjust its height are within the spirit and scope of the invention.

Folding parts can be employed to provide a collapsible cart, which may be desirable for such applications as strollers for example. The handle can fold in two or more sections and/or collapse into telescopic sections. The platform 20 and wheel base 22 can also fold by providing hinges at the desirable positions. For example, hinge 30 is provided at the interface of platform 20 and wheel base 22. Components may also be releasably attached.

Figure 12A:
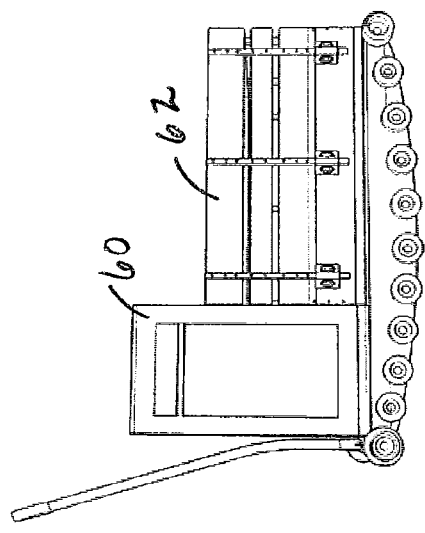
FIGS. 12A-D depict a cart with sides forming a compartment and shelf and drawer components according to an illustrative embodiment of the invention.
Figure 12B:
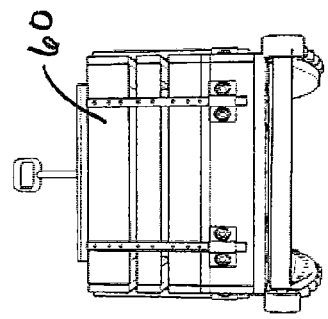
Figure 12C:
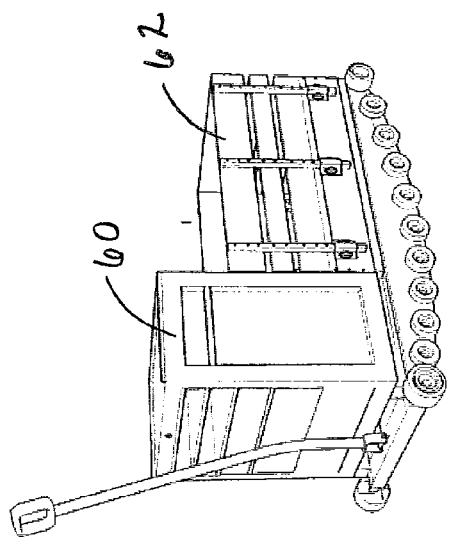
Figure 12D:
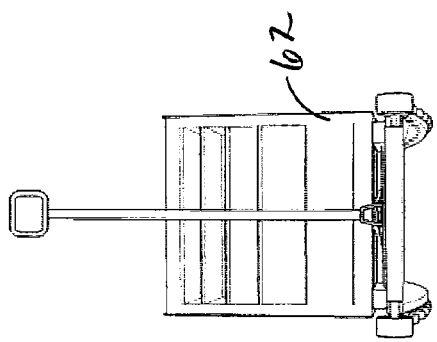

FIG. 10 shows a cart having a flat, open platform 20, on which cargo can be placed. In further embodiments of the invention, as shown in the illustrative embodiments of FIGS. 12A-D, seats, compartments, shelves, drawers and the like can be included on the cart. These components can be permanently affixed to the cart or can be removable. In an exemplary embodiment of the invention the cart is reconfigurable with various removable, interchangeable seats, compartments, shelves, drawers, etc. FIG. 12A shows a perspective view of a cart having a drawer and shelf unit 60 and a compartment 62 according to an illustrative embodiment of the invention. FIGS. 12B, 12C, and 12D depict a side view, front view, and rear view, respectively, of the cart shown in FIG. 12.

Generally the cart can include a platform as depicted in FIG. 10, or it can be built on a frame such as that depicted in FIG. 2. The frame or platform design will depend on the application of the cart.

Runners or other frame components can be adjustable to allow more wheels to contact the ground to eliminate the rocking motion when desired. Upwardly sloping runner sections can be lowered to provide at least a three-wheel contact with the ground, or adjustable auxiliary wheels can be incorporated to increase the number of wheels contacting the ground to eliminate or inhibit a rocking motion, if for example, a cart was being used on a level floor. As an illustrative example, a medical stretcher or gurney may need the arced span of wheels if being rolled on uneven ground, but upon entering a hospital, a straight line of wheels will be sufficient and likely more desirable. The same result can be accomplished by including drop-down wheels to inhibit rocking and still allow rolling of the cart as can be seen in FIG. 3 parts 302, 304.

While the invention has been described by illustrative embodiments, additional advantages and modifications will occur to those skilled in the art. The invention may be embodied in a variety of ways, for example, a system, method, device, etc. Therefore, the invention in its broader aspects is not limited to specific details shown and described herein. Modifications, for example, to the number of wheels, degree of curvature of the runners, wheel spacing and cart or device type on which the wheel mechanisms can be used, may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A cart comprising:
   a platform configured to support something being transported;
   a motorized propulsion mechanism;
   primary wheels including two or more rows of three or more non-swivelable wheels wherein the lower-most points of the wheels in a row form an arc;
   wherein the motorized propulsion mechanism rotates a plurality of the primary wheels on at least one runner;
   wherein at least one primary wheel is adjustably affixed with respect to the cart;
   wherein the primary wheels longitudinally span at least a portion of the platform;
   wherein the radius of the arc extends above the platform; and
   wherein the profile of the arc allows the cart to rock on the wheels.

2. The cart of claim 1 further comprising an electronic stabilization mechanism.

3. The cart of claim 1 wherein the cart is a personal motorized platform device.

4. The cart of claim 1 comprising an adjustable handle.

5. The cart of claim 1 wherein the cart is collapsible.

6. The cart of claim 1 wherein the one or more runners are arced.

7. The cart of claim 1 wherein the primary wheels are disposed on a non-arced surface.

8. The cart of claim 1 wherein the length of the two or more rows of primary wheels spans at least 80% of the cart length.

9. A cart comprising:
   a platform configured to support something being transported;
   a motorized propulsion mechanism;
   primary wheels including two or more rows of three or more non-swivelable wheels wherein the lower-most points of the wheels in a row form an arc;
   wherein the primary wheels are disposed on one or more runners extending longitudinally along at least a portion of the platform;
   wherein the profile of the arc allows the cart to rock on the wheels;

wherein the radius of the arc extends above the platform; and wherein one or more primary wheels, each at the end of the two or more rows of three or more non-swivelable wheels, protrude longitudinally past the edge of the platform; and an electronic speed limitation device.

10. The cart of claim 9 wherein the one or more runners are arced.

11. The cart of claim 9 wherein the primary wheels are disposed on a non-arced surface and are attached to the non-arced surface such that the bottom most points of the primary wheels in each row form an arc.

12. The cart of claim 9 wherein the cart is collapsible.

13. The cart of claim 9 wherein the length of the two or more rows of primary wheels spans at least 80% of the cart length.

14. The cart of claim 9 wherein the cart is a personal motorized platform device.

15. The cart of claim 9 comprising an adjustable handle.

16. The cart of claim 9 further comprising an electronic stabilization mechanism.

17. A cart comprising:
a platform configured to support something being transported;
a motorized propulsion mechanism;
primary wheels including two or more rows of three or more non-swivelable wheels wherein the lower-most points of the wheels in a row form an arc;
wherein the primary wheels are disposed on one or more runners extending longitudinally along at least a portion of the platform;
wherein the profile of the arc allows the cart to rock on the wheels;
wherein the radius of the arc extends above the platform; and
wherein one or more primary wheels, each at the end of the two or more rows of three or more non-swivelable wheels, protrude longitudinally past the edge of the platform; and
an electronic stabilization mechanism.

18. The cart of claim 17 wherein the cart is a personal motorized platform device.

19. The cart of claim 17 comprising an adjustable handle.

20. The cart of claim 17 wherein the cart is collapsible.

21. The cart of claim 17 wherein the one or more runners are arced.

22. The cart of claim 17 wherein the primary wheels are disposed on a non-arced surface and are attached to the non-arced surface such that the bottom most points of the primary wheels in each row form an arc.

23. The cart of claim 17 wherein the length of the two or more rows of primary wheels spans at least 80% of the cart length.

24. A cart comprising:
a platform configured to support something being transported;
a motorized propulsion mechanism;
primary wheels including two or more rows of three or more non-swivelable wheels wherein the lower-most points of the wheels in a row form an arc;
wherein the motorized propulsion mechanism rotates a plurality of the primary wheels on at least one runner;
wherein at least one primary wheel is adjustably affixed with respect to the cart;
wherein the primary wheels longitudinally span at least a portion of the platform;

wherein the radius of the arc extends above the platform;
wherein the profile of the arc allows the cart to rock; and
an electronic speed limitation device.

25. A cart comprising:
a platform configured to support something being transported;
a motorized propulsion mechanism;
primary wheels including two or more rows of three or more non-swivelable wheels wherein the lower-most points of the wheels in a row form an arc;
wherein the motorized propulsion mechanism rotates a plurality of the primary wheels on at least one runner;
wherein at least one primary wheel is adjustably affixed with respect to the cart;
wherein the primary wheels longitudinally span at least a portion of the platform;
wherein the radius of the arc extends above the platform;
wherein the profile of the arc allows the cart to rock; and
an electronic stabilization mechanism.

26. A cart comprising:
a platform configured to support something being transported;
a motorized propulsion mechanism;
primary wheels including two or more rows of three or more non-swivelable wheels wherein the lower-most points of the wheels in a row form an arc;
wherein the primary wheels are disposed on one more manners extending longitudinally at least a portion of the platform;
wherein the profile of the arc allows the cart to rock on the wheels;
wherein the radius of the arc extends above the platform;
an electronic speed limitation device; and
two or more additional wheels adjustably affixed to the cart, having a first adjusted position to allow the cart to rock on the primary wheels and a second adjusted position to prevent rocking on the primary wheels but to allow the cart to roll.

27. A cart comprising:
a platform configured to support something being transported;
a motorized propulsion mechanism;
primary wheels including two or more rows of three or more non-swivelable wheels wherein the lower-most points of the wheels in a row form an arc;
wherein the primary wheels are disposed on one or more runners extending longitudinally along at least a portion of the platform;
wherein the profile or the arc allows the cart to rock on the wheels;
wherein the radius of the arc extends above the platform;
an electronic speed limitation device; and
at least one additional heel not in the two or more rows of three or more non-swivelable wheels.

28. A cart comprising:
a platform configured to support something being transported;
a motorized propulsion mechanism;
primary wheels including two or more rows of three or more non-swivelable wheels wherein the lower-most points of the wheels in a row form an arc;
wherein the primary wheels are disposed on one or more runners extending longitudinally along at least a portion of the platform;
wherein the profile of the arc allows the cart to rock on the wheels;
wherein the radius of the arc extends above the platform;

an electronic speed limitation device; and wherein at least two of the two or more wheel rows are nonparallel to one another.

29. A earl comprising:

a platform configured to support something being transported;

a motorized propulsion mechanism;

primary wheels including, two or more rows of three or more non-swivelable wheels wherein the lower-most points of the wheels in a row form an arc;

wherein the primary wheels are disposed on one or more runners extending longitudinally along at least a portion of the platform;

wherein the profile of the arc allows the cart to rock on the wheels;

wherein the radius of the arc extends above the platform;

an electronic stabilization mechanism; and wherein at least two of the two or more wheel rows are nonparallel to one another.

30. A cart comprising:

a platform configured to support something being transported;

a motorized propulsion mechanism;

primary wheels including two or more rows of three or more non-swivelable wheels wherein the lower-most points of the wheels in a row form an are;

wherein the primary wheels are disposed on one or more runners extending longitudinally along at least a portion of the platform;

wherein the profile of the arc allows the cart to rock on the wheels;

wherein the radius of the arc extends above the platform;

an electronic stabilization mechanism; and two or more additional wheels adjustably affixed to the cart, having a first adjusted position to allow the cart to rock on the primary wheels and a second adjusted position to prevent rocking on the primary wheels but to allow the cart to roll.

31. A cart comprising:

a platform configured to support something being transported;

a motorized propulsion mechanism;

primary wheels including two or more rows of three or more non-swivelable wheels wherein the lower-most points of the wheels in a row form an arc;

wherein the primary wheels are disposed on one or more runners extending longitudinally along at least a portion of the platform;

wherein the profile of the arc allows the cart to rock on the wheels;

wherein the radius of the arc extends above the platform;

an electronic stabilization mechanism; and at least one additional wheel not in the two or more rows of three or more non-swivelable wheels.

* * * * *

UNITED STATES PATENT AND TRADEMARK OFFICE
CERTIFICATE OF CORRECTION

| | | |
|---|---|---|
| PATENT NO. | : 8,863,868 B2 | Page 1 of 1 |
| APPLICATION NO. | : 12/944324 | |
| DATED | : October 21, 2014 | |
| INVENTOR(S) | : Colin Alan Campbell | |

It is certified that error appears in the above-identified patent and that said Letters Patent is hereby corrected as shown below:

On the Title Page
In the second item (60) after Oct. 6, 2005 insert:
--, and Provisional application No. 60/775,488, filed Feb. 22, 2006--

Signed and Sealed this
Tenth Day of February, 2015

Michelle K. Lee
*Deputy Director of the United States Patent and Trademark Office*